United States Patent
Otto-Lübker et al.

(10) Patent No.: US 6,412,439 B1
(45) Date of Patent: Jul. 2, 2002

(54) SITTING POLE FOR POULTRY

(75) Inventors: Friedrich Otto-Lübker, Badbergen-Vehs; Roland Busse, Cloppenburg, both of (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

(21) Appl. No.: 09/696,880

(22) Filed: Oct. 26, 2000

(30) Foreign Application Priority Data

Nov. 5, 1999 (DE) .................................... 299 19 443 U

(51) Int. Cl.[7] .................. A01K 29/00; A01K 31/04; A01K 31/12
(52) U.S. Cl. .................. 119/161; 119/531; 119/442
(58) Field of Search .................. 119/161, 432, 119/442, 443, 468, 531, 57.8

(56) References Cited

U.S. PATENT DOCUMENTS

| | | | | |
|---|---|---|---|---|
| 1,055,387 A | * | 3/1913 | Conner | 119/531 |
| 1,331,908 A | * | 2/1920 | Frey | 119/468 |
| 2,579,355 A | * | 12/1951 | Ahrens | 119/531 |
| 2,582,095 A | * | 1/1952 | Bergeron | 119/531 |
| 3,948,219 A | * | 4/1976 | Groppel | 119/442 |
| 4,936,257 A | * | 6/1990 | Kuhlmann | 119/442 |
| 5,179,912 A | * | 1/1993 | Wu | 119/442 |
| D384,442 S | * | 9/1997 | Cirelli | 119/531 |

FOREIGN PATENT DOCUMENTS

DE    296 22 177    3/1997

* cited by examiner

Primary Examiner—Charles T. Jordan
Assistant Examiner—Elizabeth Shaw
(74) Attorney, Agent, or Firm—Collard & Roe, P.C.

(57) ABSTRACT

A sitting pole for poultry having a surface designed substantially straight on an incline, forcing the poultry perching on the sitting pole to sit in a defined alignment. The inclined plane is set at an angle of approximately 35°. The surface has a U-shaped profile with a U-base forming the inclined plane. U-legs are provided and are bent off from the U-base. The U-base can be formed by two surface sections that are set at different angles from each other.

7 Claims, 1 Drawing Sheet

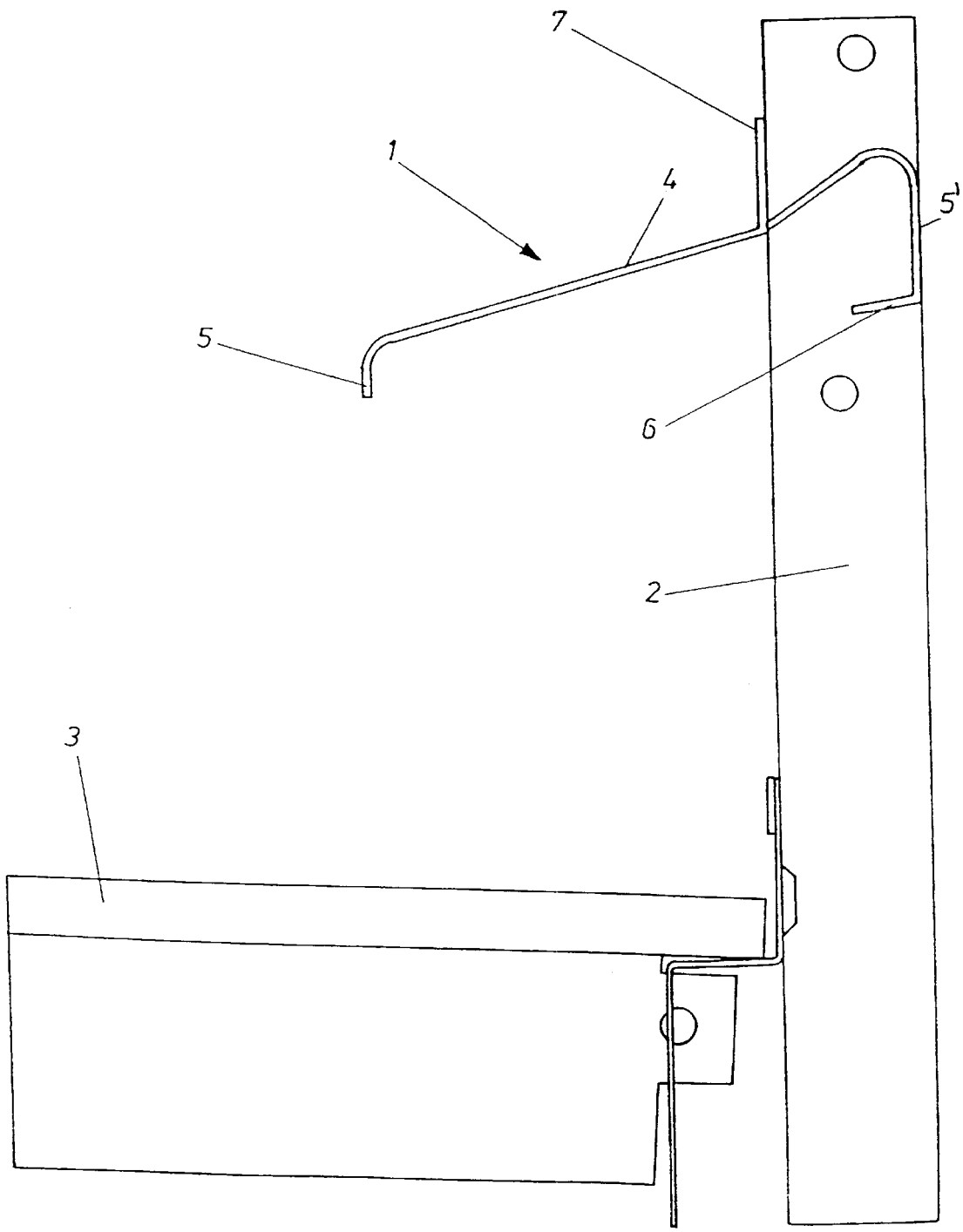

SITTING POLE FOR POULTRY

BACKGROUND OF THE INVENTION

1. Field of the Invention

The invention relates to a sitting pole (or perch) for poultry that is designed in the form of a surface that forces the poultry on the pole to sit in a defined alignment.

2. The Prior Art

Sitting poles for poultry are arranged in poultry houses to provide a resting place for the poultry to perch. The poultry can walk and sit on this sitting pole, for instance while resting during the night.

Known sitting poles are designed in the form of symmetrical sections. These sections can have circular, rectangular or mushroom head-shaped cross sections in the form of hollow or solid profiles. Due to the symmetrical form of a known sitting pole, the poultry can sit on the sitting pole in two different sitting positions, in each position transversely to the longitudinal expanse of the sitting pole. This arrangement allows excretions from the poultry sitting on the sitting pole to fall on both sides of the sitting pole. Therefore, the excrement expands in a wide area and is difficult to collect. After the animals have spent time resting on the sitting pole, a large quantity of excrement is released.

For removing the droppings, a pit or device is provided for collecting the excrement. For example, a conveyor belt is arranged below the sitting pole to catch the droppings falling from the poultry on the sitting pole. The drawback resulting from the wide area in which the droppings are collected is that not all droppings are collected by the device.

Part of the excrement, drops past the conveyor belt, and falls, for example on the floor of the housing within a zone that is littered down for the poultry. This poses a drawback because excessive amounts of droppings deposited within this area may cause health problems for the animals as well as for humans working in the poultry house. For example, inadequate drying of the droppings leads to an increased production and release of ammonia that when inhaled, causes damage to animals and humans. In addition, ammonia has an unpleasant odor, so when air is released from the interior of the poultry house and discharged into the environment, people living within the vicinity of the poultry house are annoyed by such exhaust. Furthermore, this can cause an increase in infection and hygiene risks.

Therefore, the droppings not collected by the provided device have to be removed from the poultry house at additional expenditure.

SUMMARY OF THE INVENTION

An object of the present invention is to provide a sitting pole of the type specified above which permits a nearly complete removal of the droppings by the device for collecting the excrement.

This is accomplished by providing a sitting pole designed approximately straight and having a sloped plane, forcing a defined alignment of the poultry perching on the sitting pole. This inclined plane extends at an angle in relation to a horizontal line, whereby the sitting pole is aligned so that the inclined plane is located on its top side.

This arrangement is advantageous because the inclined plane of the sitting pole effects the alignment of the poultry on the sitting pole. In this alignment, the animals are sitting in a direction that is perceived by the animals as a pleasant resting position, whereas in the prior construction, the animals are not comfortable. For longer periods of rest, the animal assumes a position in which it can place its chest on the sitting pole. Thus, the animals will perch in an alignment by which each animal can place its chest sloping downwards. This leads to the animals sitting on the same sitting pole, particularly one next to the other, aligned in the same direction. Therefore, all the droppings are located on one side with respect to the sitting pole. It has been found that the animals perching on the sitting pole in the other direction will turn after a short time by 180 degrees.

Due to the alignment of the perching poultry and the arrangement of their excretions on one side, it is possible to almost completely collect the excrement from the animals with the help of a collecting device that is located on the side below the sitting pole. The excrement is completely transported away, which assures that almost no droppings can be received in the area that the poultry reside. This means that this area cannot be dirtied by excrement dropping down from the poultry perched on the sitting pole. Therefore, the drawbacks described above will not occur and the hygienic conditions within the poultry barn are substantially enhanced.

A nearly complete alignment of the poultry perching on the sitting pole can be accomplished by providing an inclined plane set to an angle of approximately 35°. This angle provides a comfortable resting position for the poultry. On the other hand, the angle ensures that poultry perching on the sitting pole in the "wrong" direction will slide from the sitting pole, and thereby be forced to turn their sitting alignment by 180°. This angled plane permits the animals to safely cling on to the pole with their claws and to safely support themselves on the pole only when they sit on the pole in the correct position. Animals sitting turned in the "wrong" direction run the risk of not finding any sustainable support on the sitting pole. Therefore, these animals will change their perching direction.

According to another embodiment of the present invention, the sitting pole is in the shape of a U-shaped section in which the U-base forms the sloped plane and the base contains legs that are bent off from the base of the "U". The sitting pole is designed in the present case in the form of an open profile. Such an open profile can be manufactured in a simple way and in large quantities, for example with the help of suitable molding methods. The material used for producing the sitting pole may be aluminum, plastic, or galvanized steel sheet. By bending off the U-legs from the base of the "U" it is possible to form at least one edge zone of the sitting pole behind which the sitting pole can be engaged by the poultry with their claws. An animal perching on the sitting pole preferably grips with its front claws beyond the upper longitudinal edge of the sloped plane, formed by the base of the "U" and engages the pole from behind and under the associated legs of the "U". In order to avoid excessive pressure load, the bent-off zones between the base and the legs of the "U" are preferably rounded off.

According to another embodiment of the invention, the base of the "U" is formed by two sections that are set at different angles from each other. In particular, provision is made that the front, upper section of the base of the "U" is set at a steeper angle than the rear, lower section. This design offers the advantage that the upper section and the vertically associated, aligned U-leg jointly form a symmetrical partial profile. This section of the profile permits the poultry perching to approach, grip and cling to the pole with their claws. The upper section assures that the slope of the surface is preserved, and that the perching animals will assume the desired sitting position. The animals will engage the section from behind with their front claws, whereas the rear claw is located close to the lower longitudinal edge of the U-base, however, without gripping around the latter. However, the arrangement of the U-leg prevents the animal from sliding off if it grips the U-leg from behind before it assumes the desired perching position.

The sitting pole as defined by the invention can be arranged in a poultry house without effecting any other equipment installed in the facility. However, it is preferred that the sitting pole serves as a section of a supporting framework-like structure. Framework-like arrangements for keeping poultry are known to be designed, for example in the form of floor systems (or multi-level systems), or so-called "volaries". These floor systems offer the poultry different levels where the animals can perch, drink and eat. Sitting poles are preferably associated with the different levels of such floor systems, where such sitting poles serve at the same time as approach poles for the poultry. The poultry can move on a plurality of sitting poles arranged at different levels of the floor systems, for example of two-floor systems arranged one opposite from each other.

If the sitting pole is used in arrangements where poultry are housed, the section of the structure formed by the sitting pole is preferably arranged above a dropping collecting device that is associated with the poultry-housing arrangement. For example, the sitting pole is arranged above a belt for collecting the droppings, and may be slightly offset sideways in relation to the belt. This assures that the belt for collecting the droppings is located underneath the excrement of the animals on the sitting pole with a defined alignment, so that nearly all of the droppings are collected. This defined alignment of the animals allows the width of the conveyor belt to be relatively narrow, so that extra costs for a wider excrement collecting belt are avoided. Excrement is also prevented from dropping into the littered-down area that is located directly adjacent to an arrangement for housing poultry.

The present invention is advantageous because the perch can be arranged in a borderline area between a device or pit for collecting the droppings, and a littered down area, without the risk that larger quantities of droppings will fall into the littered down area. The sitting pole is arranged with its sloped plane such that the sloped plane extends inclined upwards from the area associated with the device for collecting the droppings. The animals sitting on the poultry pole, due to the more comfortable position, will assume a direction in which their excrement is arranged above the device collecting the droppings.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

The drawing shows a side view of a sitting pole for poultry according to the invention arranged in a housing for poultry.

DETAILED DESCRIPTION OF THE PREFERRED EMBODIMENT

Referring now in detail to the drawing, sitting pole 1 is secured with fastening means (not shown) on a vertically aligned strut 2 (or supporting framework) of the poultry-housing. Grid floor 3 of the housing is secured to strut 2 underneath sitting pole 1.

Sitting pole 1 is designed in the form of a U-shaped surface. U-base 4 of the surface forms a sloped plane. The sloped plane extends at an angle of approximately 35°, whereby it extends inclined upwards, starting from an area above grid floor 3. U-base 4 is formed by two sections that are set at different angles in relation to each other. A first section of U-base 4 is arranged above grid floor 3, and a second section of U-base 4 is located within the area of strut 2. The surface is arranged within the zone of strut 2 and has a greater angle of inclination than the other section.

U-legs 5, 5' are bent off from U-base 4 at its edges. The bent-off areas between U-base 4 and U-legs 5, 5' are rounded off. U-leg 5' has an area 6 that is bent off in the direction of U-leg 5, area 6 extends approximately parallel with U-base 4.

From U-base 4, a tongue 7 is bent off into a vertically aligned plane. Sitting pole 1 can be secured to strut 2 with tongue 7. Sitting pole 1 may extend between two struts of a poultry housing arrangement disposed adjacent to each other, whereby provision is made for a corresponding tongue 7 within for each strut 2 for securing sitting pole 1. Tongue 7 is for med only within the zone of a strut 2 and, therefore, does not extend over the entire expanse of sitting pole 1.

Sitting pole 1 can be approached by flying animals and used as a resting place. Due to the inclined plane of sitting pole 1, the animals sitting on the pole are forced into a defined alignment. The animals perch on sitting pole 1 with an alignment at which their excrements are located above floor 3. Animals sitting in a turned-around position will not have a comfortable hold on sitting pole 1, therefore these animals will rotate their sitting positions by 180°.

A suitable device for collecting the droppings may be arranged underneath grid floor 3, or provision can be made for a droppings-collecting device instead of grid floor 3. This device will almost completely collect the excrement dropping from the animals perching on sitting pole 1.

Sitting pole 1 may have a total width of about 100 mm. surface of U-base 4 with the lesser inclination is about 69 mm long, whereas the other section has a length of about 22 mm. The rounded transition zones between U-base 4 and U-legs 5, 5' may have a radius of 5 mm. The burrs of the free edges of U-leg 5 and section 6 of U-leg 5' are removed in order to exclude any risk of injury to the feet of the animals perching on sitting pole 1 and gripping the edges from behind.

Accordingly, while only a few embodiments of the present invention have been shown and described, it is obvious that many changes and modifications may be made thereunto without departing from the spirit and scope of the invention.

What is claimed is:

1. A sitting pole for poultry, comprising: a vertical strut and a substantially straight inclined surface connected to said strut for forcing the poultry to sit on the surface in a defined alignment so that their chests slope downwards.

2. The sitting pole according to claim 1, wherein said incline is at an angle of 35° to horizontal, sloping downwards from said strut.

3. The sitting pole according to claim 1, wherein said surface comprises a U-shaped profile, having a U-base forming said inclined plane, and U-legs bent off from said U-base.

4. The sitting pole according to claim 3, wherein said U-base comprises two surface sections, said two surface sections being set at different angles from each other.

5. The sitting pole according to claim 3, wherein said bent-off surface between said U-base and said U-legs each are rounded off.

6. The sitting pole according to claim 1, wherein said surface is integrally formed with a supporting structure of an arrangement for housing poultry.

7. The sitting pole according to claim 6, wherein said surface is disposed above a device for collecting poultry excrement.

* * * * *